Sept. 21, 1954          E. MEINDERSMA          2,689,397
METHOD OF PROVIDING REGENERATOR FILLER
MATERIAL IN AN ANNULAR SPACE
Filed Feb. 17, 1949
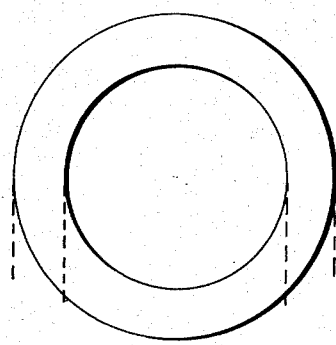
FIG. 1a.
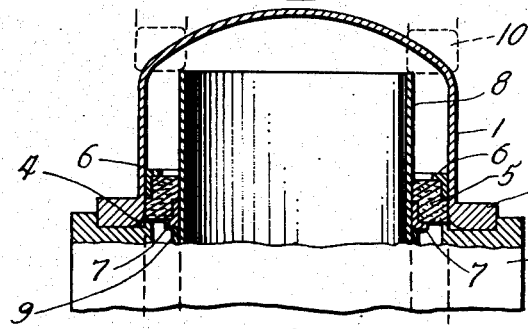
FIG. 1.
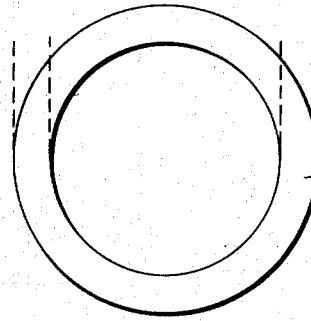
FIG. 1b.
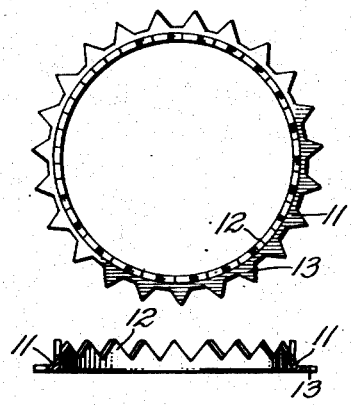
FIG. 2.
FIG. 2a.
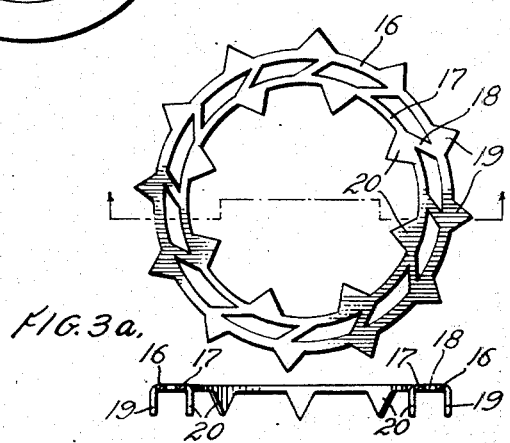
FIG. 3.
FIG. 3a.
INVENTOR
ELIZE MEINDERSMA
BY Fred M Wright
AGENT

UNITED STATES PATENT OFFICE 2,689,397

METHOD OF PROVIDING REGENERATOR FILLER MATERIAL IN AN ANNULAR SPACE

Elize Meindersma, Eindhoven, Netherlands, assignor to Hartford National Bank and Trust Company, Hartford, Conn., as trustee Application February 17, 1949, Serial No. 76,986

Claims priority, application Netherlands April 26, 1948

1 Claim. (Cl. 29—157.3)

As a rule, hot-gas piston engines comprise a regenerator chamber containing a regenerator filler. This regenerator filler has for its purpose to absorb heat from the working medium of the engine, which medium circulates from the hot side to the cold side of the engine, and to give off this heat to the medium traversing the filler in the opposite direction.

It is desirable that the filler which is distributed as evenly as possible, should fill the regenerator chamber completely. It is known to make the filler itself coherent and to make it from wire material. In such a filler these wires engage each other more or less resiliently. To fill the regenerator chamber as much as possible throughout its volume, use will generally be made of a filler of which the size slightly exceeds that of the chamber in which the filler is introduced. This may cause damage to the filler on introducing it in the regenerator chamber and on assembling and dismantling, since parts of the filler may break or scale off. These metal parts may gain access to the work chamber of the engine which has its concomitant disadvantages.

The present invention has for its object to provide means for avoiding the aforesaid disadvantages.

The hot-gas piston engine according to the present invention exhibits the feature that an annular part is provided at one or more transitions from either of the sides of an annular regenerator filler (the said sides comprising either the inner or outer standing periphery of the said annular filler) to either of the two end surfaces of the annular filler. The said annular part is arranged to enclose both one of the sides and one of the ends in the area of the transition.

In this way the regenerator filler is protected in a simple manner and damage upon its introduction is avoided. In addition, the latter operation is facilitated. In one embodiment of the invention, junctions are provided between two juxtaposed annular parts, viewed along the outline of the regenerator filler. Thus, the position of the annular parts with respect to one another is determined to a certain degree and so the coherence of the filler is promoted. In an alternative embodiment of the invention one or more of the annular parts consist of metal sheet exhibiting tags at one or both edges. This permits a simple manufacture of the annular parts. The annular parts may be punched from sheet material, the tags being subsequently bent into the desired shape.

In order that the invention may be clearly understood and readily carried into effect it will now be described more fully with reference to the accompanying drawing, in which several embodiments thereof are shown by way of example.

Fig. 1 represents a regenerator filler with associated protecting rings in a hot-gas piston engine. This hot-gas piston engine may be a hot-gas engine (hot-air engine) or a refrigerating machine, in which the direction of the cycle is opposite to that of the hot-gas engine. Fig. 1 furthermore shows the difference in size of the regenerator filler before and after its introduction.

Figs. 2 and 3, represent different forms of the protecting rings.

Figs. 2a and 3a are side elevational views of Figs. 2 and 3 respectively.

In the construction shown in Fig. 1 a heater head 1 is mounted, by means of a flange 2, on the base 3 of a hot-gas piston engine. The lower side 4 of flange 2 is rounded to facilitate the mounting of the heater head over the regenerator filler 5 which has a certain coherence in itself and may, for instance, consist of wire material. The filler is provided at the outer upper side with a ring 6 and at the lower inner side with a ring 7 as appears from the drawing. The said rings, owing to their suitably chosen shape at the transition from one of the sides of the filler 10 to an end surface, enclose the said side and said end. The filler 5 is provided between the heater head 1 and the cylindrical wall 8. The inner diameter of the ring 7 is approximately 0.1 mm. larger than the outer diameter of the wall 8, by which the mounting of the filler 5 and rings 6 and 7 is facilitated. The cylinder wall 8 is furnished with a projecting part 9 on which the ring 7 rests. Before mounting, the regenerator filler 5 is shaped as shown at 10 above the heater head 1. On comparison of the shape 10 of the filler with its shape 5 the difference in size before and after mounting clearly appears.

The regenerator filler 10 is mounted as follows. Initially, the ring 7 allows the filler 10 to be inserted over the cylinder 8 without any damage to the filler. Thereafter, the heater head 1 which has a greater diameter than the cylinder is placed over the cylinder wall 8 in spaced relation thereto whereupon the heater head 1 engages the ring 6 first upon insertion. The heater head 1 is dropped down about the cylinder wall 8 until it abuts against the rim 9 of the cylinder wall 8. The rounding 4 of flange 2 and the ring 6 permit the heater head 1 to be placed also over the filler 10 without any damage to the filler. As appears from the foregoing only those angles of the regenerator filler 5 are furnished with rings 6 and 7 which are liable to damage in mounting.

Fig. 2 shows in plan view and in side view a protecting ring 11 furnished with tags 12 and 13 at both edges.

In Fig. 3 two rings 16 and 17 are interconnected by junctions 18. The rings 16 and 17 are provided with tags 19 and 20 respectively. The tags 19 and 20 shown in the upper part of Fig. 4 have not yet been bent in the desired direction. The lower part of this figure shows the rings 16 and 17 after bending the tags 19 and 20.

What I claim is:

A method of inserting a mass of filamentary regenerator material into an annular regenerator space of a hot gas engine between the outer wall of a cylinder and a heater head which is to be mounted over said regenerator material comprising the steps of forming the filamentary material into an annular porous mass having a size slightly larger than that of the regenerator space, placing over the inside trailing edge of said mass an annular support, inserting said mass with said support about the outer wall of said cylinder and into said regenerator space, said annular support engaging the wall of said cylinder first upon said insertion, said annular support having a supporting portion extending over one end surface of the mass and a supporting portion extending over an adjacent side surface thereof, placing over the diametrically opposite, outside leading edge of said mass a second annular support similar to said first support, and placing said heater head about the outer wall of said cylinder and said mass whereby said heater head engages said second annular support first upon said placement.

References Cited in the file of this patent

UNITED STATES PATENTS

| Number | Name | Date |
|---|---|---|
| 206,597 | McKinley | July 30, 1878 |
| 289,481 | Wilcox | Dec. 4, 1883 |
| 289,482 | Wilcox | Dec. 4, 1883 |
| 1,460,677 | Lundgaard | July 3, 1923 |
| 1,730,580 | Lundgaard | Oct. 8, 1929 |
| 1,858,508 | Kignell et al. | May 17, 1932 |
| 2,371,346 | Morrow | Mar. 13, 1945 |
| 2,484,392 | Van Heeckeren | Oct. 11, 1949 |
| 2,543,481 | Wichs | Feb. 27, 1951 |
| 2,550,070 | La Brecque | Apr. 24, 1951 |
| 2,555,125 | Gregory | May 29, 1951 |

FOREIGN PATENTS

| Number | Country | Date |
|---|---|---|
| 56,737 | Netherlands | July 8, 1944 |
| 920,275 | France | Jan. 2, 1947 |